United States Patent
Grieves et al.

(10) Patent No.: US 8,917,275 B2
(45) Date of Patent: Dec. 23, 2014

(54) AUTOMATED CONTRAST VERIFICATIONS

(75) Inventors: Jason Anthony Grieves, Redmond, WA (US); Matthew Karr, Bellevue, WA (US); Katherine Ann Corner, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 12/815,383

(22) Filed: Jun. 14, 2010

(65) Prior Publication Data
US 2011/0304641 A1    Dec. 15, 2011

(51) Int. Cl.
| | |
|---|---|
| *G06T 11/00* | (2006.01) |
| *G06K 9/00* | (2006.01) |
| *G09G 5/14* | (2006.01) |
| *G06K 9/38* | (2006.01) |
| *G06K 9/03* | (2006.01) |
| G09G 5/20 | (2006.01) |
| G06T 11/20 | (2006.01) |
| G09G 5/02 | (2006.01) |
| G09G 5/22 | (2006.01) |

(52) U.S. Cl.
CPC .. *G09G 5/14* (2013.01); *G09G 5/20* (2013.01); *G06K 9/38* (2013.01); *G06T 11/203* (2013.01); *G06K 9/036* (2013.01); *G09G 5/02* (2013.01); *G09G 5/22* (2013.01); *G09G 2320/066* (2013.01); *G09G 2320/0693* (2013.01); *G09G 2320/103* (2013.01); *G09G 2340/02* (2013.01)
USPC ........ 345/467; 345/468; 345/469; 345/469.1; 345/470; 345/589; 382/165; 382/172; 382/274

(58) Field of Classification Search
CPC .. G06T 11/203; G09G 2320/103; G09G 5/02; G09G 5/14; G06K 9/036; G06K 9/38
USPC ................... 382/165-172, 274; 345/467-469
See application file for complete search history.

(56) References Cited

U.S. PATENT DOCUMENTS 5,588,071 A    12/1996    Schultz
(Continued)

OTHER PUBLICATIONS

Lemon, Gez., "Colour Contrast Analyser Firefox Extension", Retrieved at << http://juicystudio.com/article/colour-contrast-analyser-firefox-extension.php >>, Feb. 12, 2006, pp. 14.

(Continued)

*Primary Examiner* — Jin-Cheng Wang
(74) *Attorney, Agent, or Firm* — Stolowitz Ford Cowger LLP (57) ABSTRACT

A developer tool is used to programmatically calculate the contrast between the text and background in a user interface. A luminosity ratio is automatically calculated by the tool by capturing an image of a user interface, archiving user interface elements that do not contain text, performing optical character recognition on the remaining user interface elements to find pixels on the text part of the user interface element and pixels on the background part of the user interface element, and finally calculating the luminosity ratio. Results including errors, warnings and luminosity ratio for one or more hotspots in the image can be returned. Results can be used to identify user interface elements that comply or fail to comply with visibility guidelines for contrast between user interface text and background.

23 Claims, 5 Drawing Sheets

(56) References Cited

U.S. PATENT DOCUMENTS

| | | | | |
|---|---|---|---|---|
| 5,670,986 | A | 9/1997 | Leak | |
| 6,636,228 | B2 | 10/2003 | Morton et al. | |
| 6,941,013 | B1* | 9/2005 | Drayer | 382/168 |
| 7,071,947 | B1* | 7/2006 | Papakipos et al. | 345/581 |
| 7,283,683 | B1* | 10/2007 | Nakamura et al. | 382/274 |
| 8,111,235 | B2* | 2/2012 | Baba et al. | 345/102 |
| 2005/0123195 | A1* | 6/2005 | Takarada | 382/172 |
| 2005/0281460 | A1* | 12/2005 | Wilt | 382/168 |
| 2008/0272999 | A1* | 11/2008 | Kurokawa et al. | 345/89 |
| 2009/0263016 | A1 | 10/2009 | Kuo | |
| 2010/0091348 | A1* | 4/2010 | Iwamoto | 358/518 |
| 2010/0158373 | A1* | 6/2010 | Li et al. | 382/172 |
| 2010/0246947 | A1* | 9/2010 | Ma | 382/167 |
| 2010/0277754 | A1* | 11/2010 | Arimura et al. | 358/1.9 |
| 2011/0280477 | A1* | 11/2011 | Al-Omari et al. | 382/165 |

OTHER PUBLICATIONS

He, et al., "User-Assisted Archive Document Image Analysis for Digital Library Construction", Retrieved at << http://www.cse.salford.ac.uk/prima/ICDAR2003/Papers/0091_585_he_j.pdf >>, ICDAR, Proceedings of the Seventh International Conference on Document Analysis and Recognition, vol. 1, Aug. 3-6, 2003, pp. 5.

Vasudevan, et al., "Characters and User Interface Components Recognition from Desktop Digital Images", Retrieved at << http://www.actapress.com/PaperInfo.aspx?PaperID=28959&reason=500 >>, 2006, p. 1.

"Convert RGB Image or Colormap to Grayscale", Retrieved at << http://www.mathworks.com/access/helpdesk/help/toolbox/images/rgb2gray.html >>, Retrieved Date: Apr. 20, 2010, p. 1.

"Display Histogram of Image Data", Retrieved at << http://www.mathworks.com/access/helpdesk/help/toolbox/images/imhist.html >>, Retrieved Date: Apr. 20, 2010, pp. 2.

* cited by examiner

```
i = o;
int mode[2];            //may fill part of array
threshold = 7;
while((the data set is not empty) && (found 3 modes or fewer)
{
    mode[i] = data_set.find_mode();   //find the mode of the set
    //step through data set and remove any value from the set within: mode[i] plus or
    //minus threshold
    i++;      //as long as data set still contains values, find another mode in remaining
              //data set
}
```

AUTOMATED CONTRAST VERIFICATIONS

BACKGROUND

Even more so than for others, people with disabilities can find using a computer to be a challenge. For example, vision difficulties and impairments including low vision, color blindness, and blindness can make reading the screen difficult. Among adult computer users in the United States, it is estimated that more than one quarter experience some kind of vision difficulty.

Today, there are a number of options for individuals with vision difficulties to modify their computer displays and appearance to make them easier to see, or, alternatively, to receive information through sound or touch. One aspect of making it easier for people with visual and cognitive impairments to use a computer is ensuring that user interfaces adhere to certain standards of text contrast. For example, a 5:1 luminosity ratio for text against the background color is generally considered vision-friendly.

SUMMARY

A user interface can be programmatically analyzed for compliance/noncompliance with provided text contrast standards for visibility. To determine if a user interface element complies with text contrast standards, areas of text in the user interface can be cropped. Using a tree structure representation of the user interface elements, elements that are containers for other user interface elements or elements that do not include text can be eliminated to avoid duplicate processing. The user interface elements that include text can be identified by optical character recognition (OCR) processing. Images in a color model such as a RGB (Red-Green-Blue) color model, a YUV color model or the like, can be transformed to 8-bit grayscale images, from which a grayscale histogram can be created. "Hotspot" regions in the RGB images and the grayscale images can be marked by identifying peaks of interest in the histogram and calculating locations of the identified peaks using the grayscale value to reverse look-up the RGB or YUV components. Luminosity values for each background pixel and text pixel in the hotspot can be calculated. A luminosity ratio for text against the background color can be calculated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A developer tool can be used to programmatically calculate the contrast between the text and background colors in a user interface. A luminosity ratio is automatically calculated by the tool by capturing an image of a user interface, discarding user interface elements that are containers for other elements and/or are determined to not include text, cropping the background to a one-pixel border around the text and performing optical character recognition to find pixels on the text part of the user interface element and pixels on the background part of the user interface element. A luminosity ratio is calculated. Results including errors, warnings and luminosity ratio for one or more hotspots in the image can be returned. Results can be used to determine if a particular user interface element meets or fails to meet guidelines for readability, can increase or decrease a priority level of a user interface element in a list of user interface elements to receive programmer attention (e.g., to be changed before a next release or a next service pack or update) and the like. The results can be generated and displayed on a display screen of a software development computer or printed on a printer or otherwise presented as known in the arts.

Automated Contrast Verifications

Figure 1A:
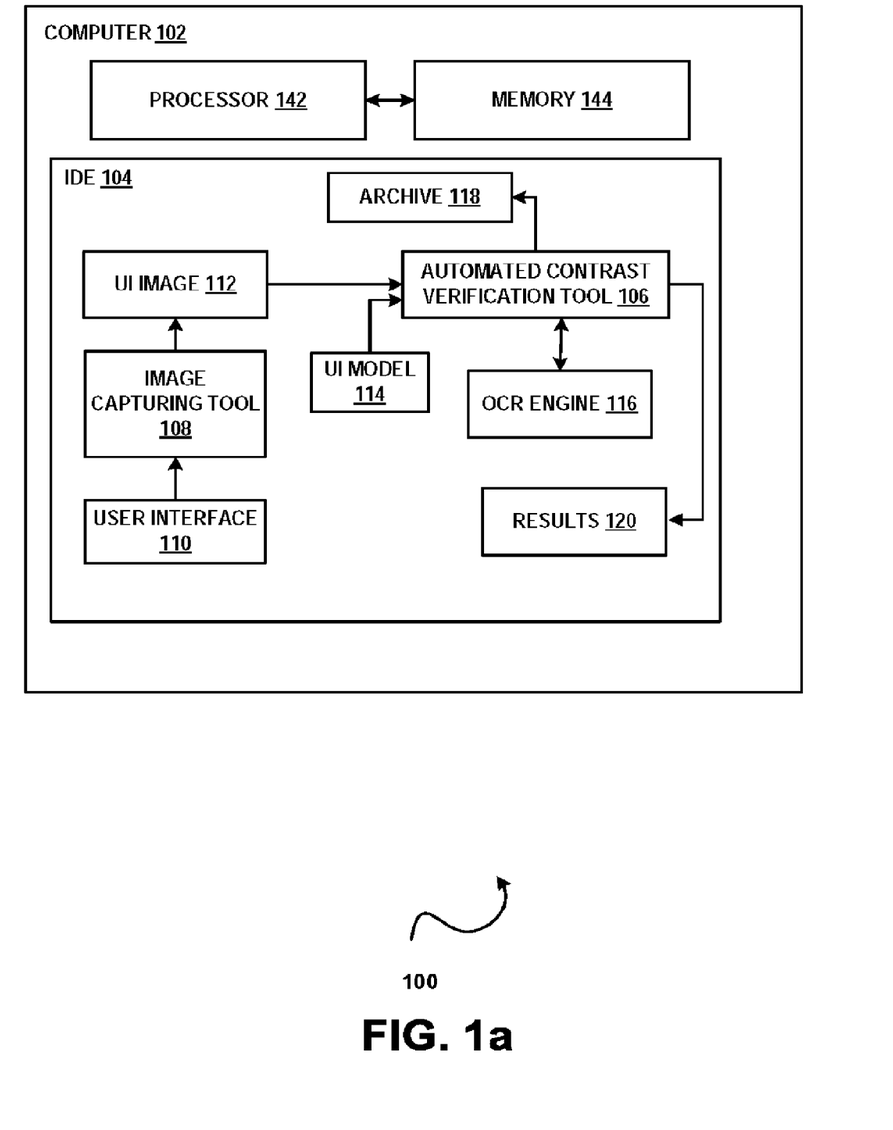
FIG. 1a illustrates an example of a system 100 for automating contrast verifications in accordance with aspects of the subject matter disclosed herein.

FIG. 1a illustrates an example of a system 100 for automated contrast verifications. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (e.g., IDE 104) such as the ones described and illustrated below with respect to FIG. 4. The software being developed may include software that is intended for people with disabilities as described above. System 100 or portions thereof may be provided as a stand-alone system or as a plug-in or add-in.

System 100 may include one or more of: a processor (such as processor 142), a memory such as memory 144, and an automated contrast verification tool 106. System 100 may also include an image capturing tool 108 or alternatively, the image capturing tool may be integrated within the automated contrast verifier tool (not shown). System 100 may also include a user interface model 114 that includes information about user interface elements and/or an optical character recognition engine 116 that translates scanned images into machine-encoded text. Alternatively, the optical character recognition engine may be integrated within the automated contrast verification tool (not shown). Other components well known in the arts may also be included but are not here shown. It will be appreciated that one or more modules implementing the automated contrast verification tool 106 and/or image capturing tool 108 and/or optical character recognition engine 116 can be loaded into memory 144 to cause one or more processors such as processor 142 to perform the actions attributed to the automated contrast verification tool 106 and/or image capturing tool 108 and/or optical character recognition engine 116.

In response to initiation of the automated contrast verification tool by for example, a user clicking on a "run verification" button, or selecting a "contrast verification" option on a menu displayed on a computer display device or by any other well-known human or machine-initiated means, an image or screenshot can be taken of a user interface that is identified or focused on. The user interface for which the image or screenshot is to be taken can be identified by various well-known ways, such as by clicking on the user interface, selecting the user interface from a list or by otherwise obtaining focus by selecting or highlighting the image.

If the snapshot taking module is included within the automated contrast verification tool, the automated contrast verification tool can receive a focused user interface (a user interface that has been selected, is highlighted or that "has the focus") and can capture a screen image. Alternatively, as pictured in FIG. 1a, a selected user interface 110 can be received by the image capturing tool such as image capturing tool 108.

In response to receiving the selected user interface 110 the image capturing tool 108 can create an image such as a user interface image 112 of the selected user interface 110. In accordance with some aspects of the subject matter disclosed herein, a TIFF screenshot can be captured. Tagged Image File Format (abbreviated TIFF) is a lossless file format for storing images. The TIFF format is widely supported by image-manipulation applications, by publishing and page layout applications, by scanning, faxing, word processing, optical character recognition (OCR) applications and other applications. Originally, due to limitations of desktop scanners, TIFF was a binary image format in which there were only two possible values for each pixel. As scanners became more powerful, and as desktop computer disk space became more plentiful, TIFF grew to accommodate grayscale images, and then color images. Today, TIFF is a popular format for high color-depth images.

It will be appreciated that other types of image formats including but not limited to JPEG and PNG may be used in addition to or instead of TIFF images. JPEG is an acronym for Joint Photographic Experts Group, the group that developed the JPEG standard. PNG is an acronym for Portable Network Graphics and is a format that was created to improve upon GIF (Graphics Interchange Format). The image such as user interface image 112 captured by the image capturing tool 108 or automated contrast verification tool can be a TIFF image, a PNG image or any image in any suitable format. The user interface image 112 can be received by the automated contrast verification tool 106. If viewed from a programmatic access API (application programming interface) such as MSAA (Microsoft® Active Accessibility), UIA (UI Automation, a Microsoft® computer accessibility technology) or IAccessible 2 (an open standard in the Linux Foundation computer accessibility technology) user interface elements can be arranged in a tree structure. The automated contrast verification tool 106 may discard the user interface elements which are containers for other user interface elements to avoid duplicate processing. In addition, in accordance with some aspects of the subject matter disclosed herein, heuristics can be applied so that only elements that include text, as indicated by a programmatic access API specification, are processed. This approach can avoid many false positives because the OCR engine only reviews user interface elements that include text. Specifically, the heuristics can use the UI Automation ControlType variable that identifies which user interface elements include text or which user interface elements are likely to include text. The ControlType variable may also include information that identifies user interface elements that include text.

The automated contrast verification tool 106 may also or alternatively receive a model of the user interface elements such as user interface model 114 which can include data that describes the user interface elements. The model of the user interface element may include information such as but not limited to a variable that identifies which user interface elements typically include text or which user interface elements are likely to include text. The user interface elements that typically include or may include areas of text can then be passed to an optical character recognition engine 116 for processing. User interface elements that do not have text can be archived in an archive such as archive 118. For example, user interface elements such as the check box, combo box, header item, list item, radio button, tab item and tree item typically have text and can be passed to the optical character recognition engine 116. User interface elements such as: document, edit, hyperlink menu item, text, title bar, tooltip are likely to have text and can be passed to the optical character recognition engine 116. User interface elements including the button, calendar, data grid, data item, group, header, image, list menu, menu bar, pane, progress bar, scroll bar, separator, slider, spinner, split button, status bar, tab, table, thumb, tool bar, tree and window do not typically have text and may be archived in archive 118. Elements with text can be cropped before being passed to the optical character recognition engine 116.

Figure 1B:
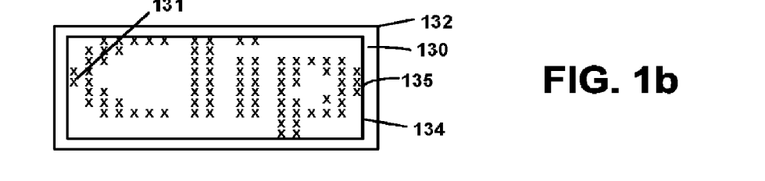
FIG. 1b illustrates an example of a clipped image in accordance with aspects of the subject matter disclosed herein.

In accordance with some aspects of the subject matter described herein, archived user interface elements do not appear in the results 120 of the automated contrast verification tool 106. The cropped user interface element images containing text can be sent to the optical character recognition engine 116 to be further cropped. The optical character recognition engine 116 can be run on each of the cropped user interface element images. In response to detecting text, the image can be further cropped to form a tight rectangle around the identified text. In accordance with some aspects of the subject matter described herein, the text may be surrounded by a border of pixels forming a perimeter around the text. For example, in FIG. 1b the one-pixel border 130 around the text ("CLIP" 135) is delimited by the space between outer rectangle 132 and inner rectangle 134. This technique can be applied to fonts including but not limited to Microsoft® ClearType®. ClearType® is a subpixel rendering technology that attempts to improve the appearance of text on certain types of computer display screens by making the text appear smoother (less jagged), increasing edge contrast and readability of small fonts.

If text is not identified by the optical character recognition engine 116, a check may be performed on the role/control type information provided by MSAA/UIA. If the user interface element is one in which text is typically encountered, an error can be generated. If the role indicates that text is likely (see tables above), then a warning can be generated.

Each image (which may have been further cropped by the optical character recognition engine 116) may undergo a transformation in which each colored pixel (e.g., an RGB pixel is represented by 3 values ranging from 0-255) is changed to an 8-bit grayscale pixel (1 value ranging from 0-255). This conversion may be achieved by a color blending of the RGB components as described in the following computation:

Grayscale value=0.2126*R+0.7152*G+0.0722*B

Alternatively, any other formula for converting to a grayscale value can be used.

Figure 1C:
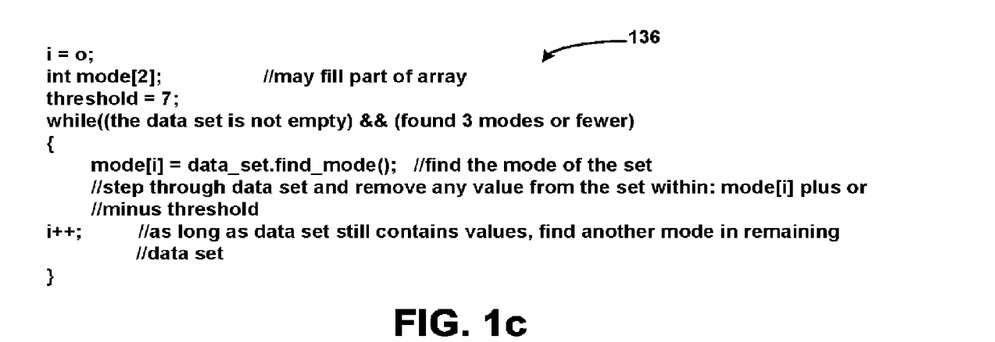
FIG. 1c illustrates an example of a procedure in pseudo-code iterated to identify background pixels of interest in accordance with aspects of the subject matter disclosed herein.

This conversion returns a value between 0 (pure black) and 255 (pure white), comprising the 8-bit grayscale representation of the pixel. For example, a pixel at position (x,y) (e.g., position (2,7) 131 in FIG. 1*b*) in an original RGB image may have an RGB value of (255, 136, 136) meaning the red component of the color of the pixel has a value of 255, the green component has a value of 136 and the blue component has a value of 136. Converting the RGB value of such a pixel returns a grayscale value of 161 for the pixel at position (2,7). The original cropped image can be converted to a grayscale image and then to an image where each pixel position is a number representing the grayscale values of the pixel at that location as represented in FIG. 1*e*, grayscale image 160.

The 1-pixel border (e.g., border 130) can be used to identify background pixels with which the text pixels can be compared. To identify the background pixels, a data set can be created that includes the grayscale values from the one-pixel border layer. The pseudo-code 136 appearing in FIG. 1*c* is an example of code that can be used to find the background pixels although it will be appreciated by those of skill in the art that other ways of finding the background pixels are possible.

In accordance with aspects of the subject matter disclosed herein, one mode can be chosen for solid backgrounds. For simple gradient backgrounds two modes can be chosen, and for complex gradient backgrounds, three modes can be chosen. For gradient backgrounds that include more than three modes, the additional modes may be ignored. It will be appreciated that in accordance with aspects of the subject matter disclosed herein, while background colors are assumed to potentially contain gradients of color, text is assumed to be non-gradient, that is, text is assumed to be a single, solid color. The dataset comprising the grayscale set of pixels from the transformed image can be converted to a histogram to identify the color of the text in the image. In accordance with aspects of the subject matter disclosed herein, the histogram created from the dataset may comprise 256 bins ranging from 0 to 255 where 0 is pure black and 255 is pure white. An example of a histogram 150 appears in FIG. 1*d*.

The maxima representing the background (and corresponding background noise) can be removed from the histogram, so that the only relevant peaks remaining are indicators of the text. That is, the portions of the histogram that pertain to the background (e.g., peak 152) can be ignored. Similarly any bins within a threshold value (e.g., plus or minus 7) of the maxima can be considered to be noise from the rendering on-screen. For example, in FIG. 1*d* peak 153 can also ignored. As an alternative example, suppose that a text-containing user interface element image includes a single background mode of 230 and the threshold value is determined to be 7. Any values in the histogram between 223 (230−7) and 237 (230+ 7) can then be ignored. If the background included more than one mode, the values in the threshold vicinity of the additional modes can also be ignored. After eliminating the histogram values corresponding to the background values, the remaining peaks in the histograms represent the values for the text. In accordance with aspects of the subject matter disclosed herein, the three remaining local maxima can be determined.

Figure 1D:
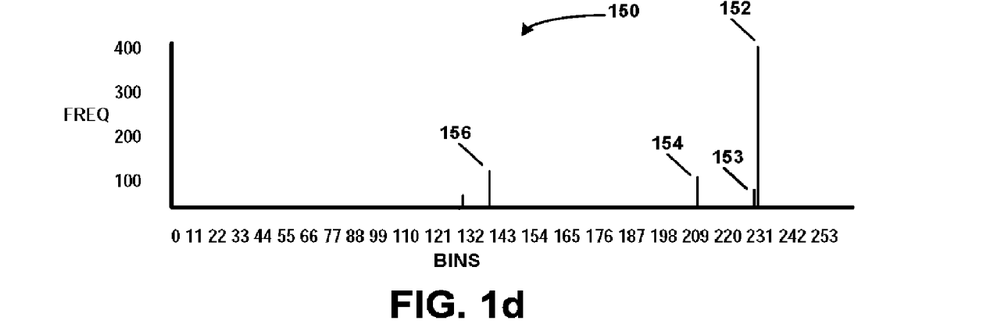
FIG. 1d illustrates an example of a histogram 140 representing a range of 8-bit grayscale values for an image in accordance with aspects of the subject matter disclosed herein.
Figure 1E:
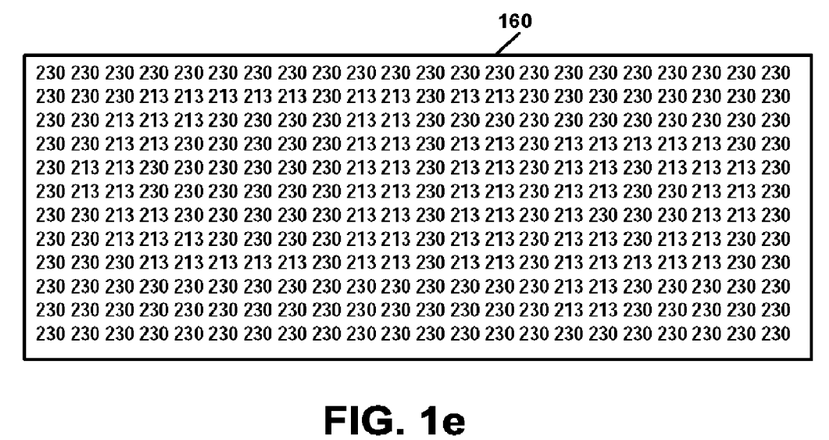
FIG. 1e illustrates an example of a dataset of 8-bit grayscale values of the image of FIG. 1b in accordance with aspects of the subject matter disclosed herein.

In FIG. 1*d*, two maxima representing text are found (peak 154 and peak 156). Of the determined maxima representing the text, the maxima farthest from the value representing the background pixels is chosen for the color of the text (peak 156 in FIG. 1*d*). A reverse look-up can be performed on the grayscale value chosen for the color of the text to transform the grayscale value back to the RGB values. For example, if the reverse look up of the pixel at position (2,7) is performed, the grayscale value of 161 can be replaced with the RGB value of (255, 136, 136). Suppose, for example, that the histogram indicates that there is a single grayscale value of 138 for the text and a single grayscale value of 255 for the background pixels. The grayscale image can be examined for an occurrence of a value of 138.

The pixel location at which the value of 138 in the grayscale image is detected can be recorded (e.g., (x,y)=(3,12)) and the corresponding RGB pixel from the original image can be determined by reverse look-up. Similarly, the pixel location at which the value of 255 in the grayscale image is detected is recorded (e.g., (x,y)=(1,1)) and the corresponding RGB pixel from the original image can be determined by reverse look-up (e.g., (255, 255, 255). The RGB component values are recorded for locations representing text and background values and the recorded values are used to calculate luminosity ratio at this particular location. An image that has a gradient background may include several areas for which the luminosity ratio is calculated. That is, a luminosity ratio may be calculated between each of the background pixels chosen and the text pixel chosen. To find these ratios, the original RGB values for the 2 pixels of interest are determined. To determine the original values for the first background pixel and the text pixel, the linearized R, G, and B components are found where:

linearized<color>==<color>lin=(color/FS)2.2

FS=Full Scale=255 (for 8-bit color channels)

The linearized color components are used to calculate the luminosity value for each pixel.

Luminosity=$L$=0.2126*$R_{lin}$+0.7152*$G_{lin}$+0.0722*$B_{lin}$

The luminosity ration is calculated where L1 and L2 are the two luminosity values found for each pixel. Luminosity Ratio is defined as:

($L$1+0.05)/($L$2+0.05):1

In accordance with some aspects of the subject matter disclosed herein, if the ratio is greater than 5:1, then the text and background is deemed to be a passed test case. If there are 3 background pixels (with an assumed single text pixel) to test, 3 luminosity ratios are calculated, with one for each text-background comparison.

Figure 2:
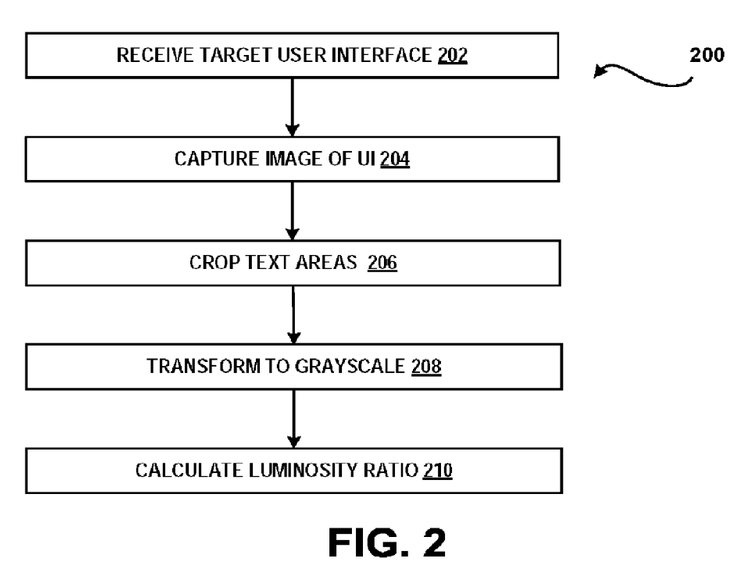
FIG. 2 is a flow diagram of an example of a method 200 for automating contrast verifications in accordance with aspects of the subject matter disclosed herein.

FIG. 2 is an example of a method 200 for an automated (programmatic) method of contrast verification. At 202, a user may set up a test environment and activate the automated contrast verification tool as described above with respect to FIG. 1. A user interface can be selected on which contrast verification is to be performed. The automated contrast verification tool may execute in background. At 204, an image of the user interface is captured, as described more fully above. User interface elements that lack text can be filtered from the image. At 206, text areas can be cropped and OCR recognition processing can be performed on the cropped images. At 208, the colored image can be converted to grayscale. At 210, the luminosity ratio is calculated. Results can be displayed or provided to a user on a display device (e.g., of a software development computer), printer or other device. In accordance with some aspects of the subject matter disclosed herein, results may be manually checked for validation. A user can accept, suppress or manually override test results. A summary report of the test results may be provided. Results can be used to provide feedback to developers concerning visibility of user interfaces as determined by contrast between text and background colors.

Example of a Suitable Computing Environment

Figure 3:
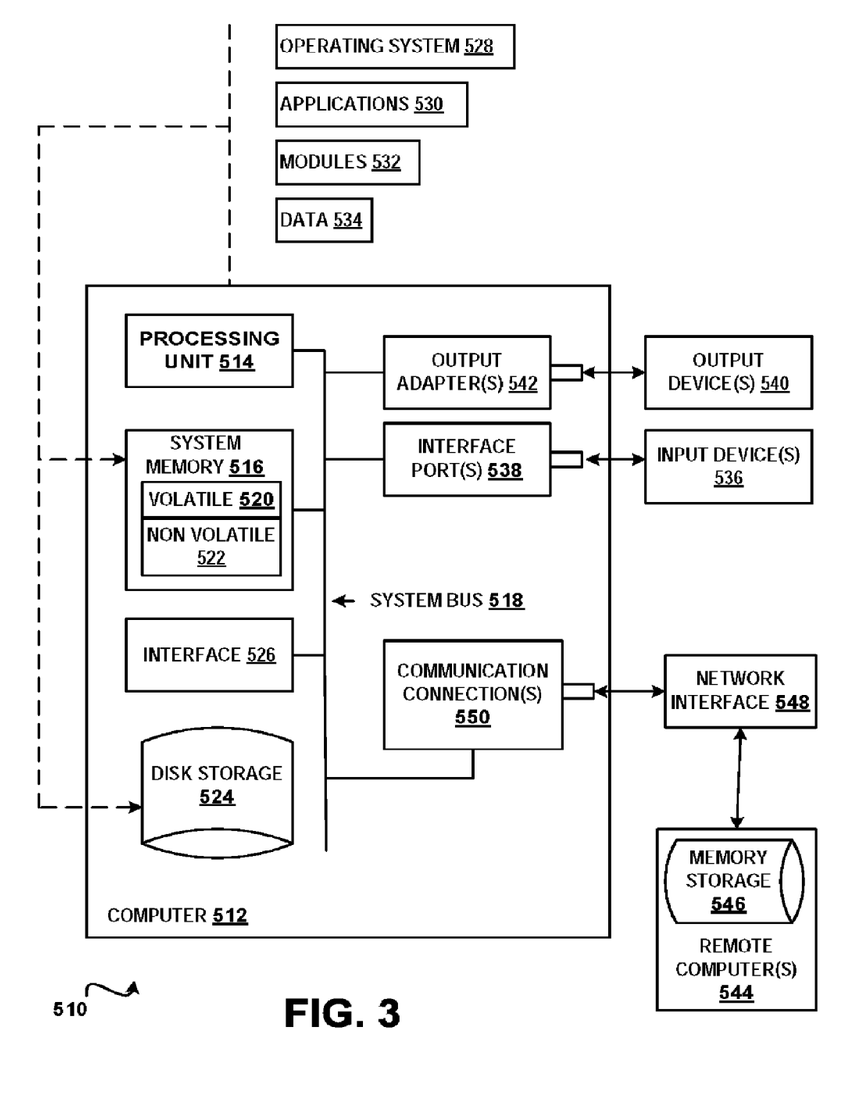
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
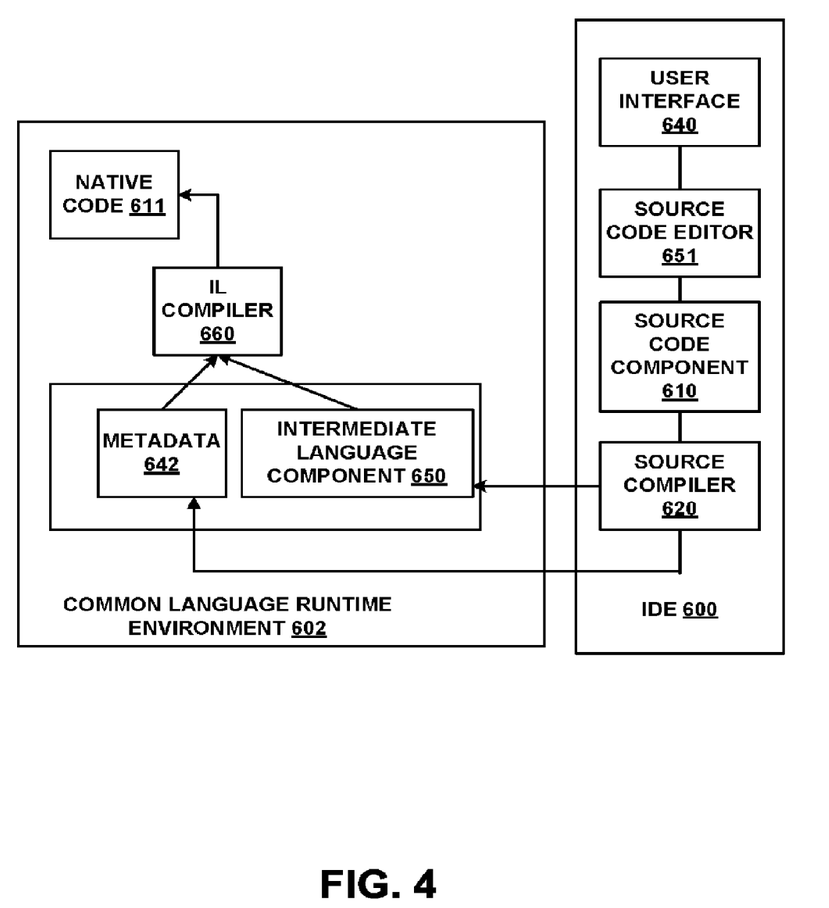
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
    a processor and a memory; and
    a module configured to cause the processor to:
        obtain a first image of a user interface element that includes text;
        responsive to obtaining the first image, generate a second different image that comprises a grayscale representation of the first image;
        correlate a subset of a plurality of maxima of a histogram of the second image with a background pixel in the second image;
        determine a first maximum on the histogram of the second image by locating at least one maximum from the correlated ones of the plurality of maxima;
        responsive to determining the first maximum on the histogram of the second image, identify, in the first image, a first pixel corresponding to the determined first maximum;
        select, from the uncorrelated ones of the plurality of maxima, a second maximum farthest from the first maximum;
        wherein the second maximum corresponds to the text of the user interface element and the first maximum does not correspond to the text of the user interface element;
        responsive to selecting the second maximum, identify, in the first image, a second different pixel corresponding to the determined second maximum; and
        calculate a ratio of a value associated with one of the identified first and second pixels to a value associated with the other of the identified first and second pixels.

2. The system of claim 1, wherein the values are associated with a Red Green Blue (RGB) color model.

3. The system of claim 1, further comprising a module configured to cause the processor to crop a portion of a received image of the user interface element that is outside a one-pixel border of the text of the user interface element to obtain the first image.

4. The system of claim 3, further comprising a module to locate the background pixel in the second image, wherein the module to locate the background pixel in the second image is configured to cause the processor to:
    after the cropping, create a data set that includes the grayscale values corresponding to the border of the first image;
    determine a mode of the data set;
    create a next data set that is a subset of the previously created data set, wherein the next data set includes only the values of the previously created data set that are not within a range of the determined mode of the previously created data set plus or minus a threshold, and if the next data set contains at least one value, determining a mode of the next data set;
    if the mode of the next data set is determined, repeat said creating until a data set with no values is created; and
    locate the background pixel in the second image responsive to data set creation completion.

5. The system of claim 1, further comprising a module configured to cause the processor to discard a portion of a received image to obtain the first image, wherein the discarded portion represents a container for other user interface elements.

6. The system of claim 1, further comprising a module configured to cause the processor to:
    apply heuristics based on a programmatic access Application Programming Interface (API) specification; and
    obtain the first image responsive to a result of the application of the heuristics.

7. The system of claim 1, further comprising a module configured to cause the processor to use an optical character recognition engine that recognizes text characters in a scanned image to obtain the first image.

8. The system according to claim 1, wherein the value associated with the identified first pixel is a sum of a first product of a first constant and a red component of a color of the identified first pixel, a second product of a second constant and a green component of the color of the identified first pixel, and a third product of a third constant and a blue component of the color of the identified first pixel.

9. The system according to claim 8, wherein the value associated with the identified second pixel is a sum of a fourth product of the first constant and a red component of a color of the identified second pixel, a fifth product of the second constant and a green component of the color of identified second pixel, and a sixth product of the third constant and a blue component of the color of the identified pixel.

10. The system according to claim 9, wherein the value associated with the identified first pixel comprises a Luminosity value.

11. The system of claim 1, wherein correlating the subset of the plurality of maxima of the histogram of the second image with the background pixel in the second image further comprises:
identifying a bin of the histogram that is within a threshold value of the maximum of the background pixel; and
forming the subset responsive to identifying the bin of the histogram.

12. A method comprising:
obtaining by a module executing on a software development computer a first image of a user interface element captured by an image capturing tool, wherein the user interface element includes text;
responsive to obtaining the first image, generating a second image that comprises a grayscale representation of the first image;
correlating a subset of a plurality of maxima of a histogram of the second image with a background pixel in the second image;
determining a first maximum on the histogram of the second image by selecting at least one maximum from the correlated ones of the plurality of maxima;
responsive to determining the first maximum on the histogram of the second image, identifying, in the first image, a first pixel corresponding to the determined first maximum;
selecting, from the uncorrelated ones of the plurality of maxima, a second maximum farthest from the first maximum;
wherein the second maximum corresponds to the text of the user interface element and the first maximum does not correspond to the text of the user interface element;
responsive to selecting the second maximum, identifying, in the first image, a second different pixel corresponding to the determined second maximum; and
calculating a ratio of a value associated one of the identified first and second pixels to a value associated with the other of the identified first and second pixels;
generating results comprising the calculated ratio; and
displaying the generated results on a display device of the software development computer.

13. The method of claim 12, further comprising:
cropping a portion of a received image of the user interface element that is outside a one-pixel border of the text of the user interface element to obtain the first image.

14. The method of claim 13, wherein correlating the subset of the plurality of maxima of the histogram of the second image with the background pixel in the second image further comprises:
identifying a bin of the histogram that is within a threshold value of the maximum of the background pixel; and
forming the subset responsive to identifying the bin of the histogram.

15. The method of claim 14, further comprising:
after the cropping, creating a data set that includes the grayscale values corresponding to the border of the first image;
determining a mode of the data set;
create a next data set that is a subset of the previously created data set, wherein the next data set includes only the values of the previously created data set that are not within a range of the determined mode of the previously created data set plus or minus a threshold, and if the next data set contains at least one value, determining a mode of the next data set;
if the mode of the next data set is determined, repeating said creating until a data set with no values is created; and
locating the background pixel in the second image responsive to data set creation completion.

16. The method of claim 12, further comprising:
discarding a portion of a received image to obtain the first image, wherein the discarded portion represents a container for other user interface elements.

17. The method of claim 12, further comprising:
applying heuristics based on a programmatic access Application Programming Interface (API) specification; and
obtaining the first image responsive to a result of the application of the heuristics.

18. The method of claim 12, wherein the values correspond to a Red Green Blue (RGB) color model.

19. A memory device having instructions stored thereon that, in response to execution by a processing device, cause the processing device to perform operations comprising:
obtaining a first image of a user interface element that includes text;
responsive to obtaining the first image, generating a second different image that comprises a grayscale representation of the first image;
correlating a subset of a plurality of maxima of a histogram of the second image with a background pixel in the second image;
determining a first maximum on the histogram of the second image by selecting at least one maximum from the correlated ones of the plurality of maxima;
responsive to determining the first maximum on the histogram of the second image, identifying, in the first image, a first pixel corresponding to the determined first maximum;
selecting, from the uncorrelated ones of the plurality of maxima, a second maximum farthest from the first maximum;
wherein the second maximum corresponds to the text of the user interface element and the first maximum does not correspond to the text of the user interface element; and
responsive to selecting the second maximum, identifying, in the first image, a second different pixel corresponding to the determined second maximum; and
calculating a ratio of a value associated with one of the first and second identified pixels to a value associated with the other of the first and second identified pixels.

20. The memory device of claim 19, wherein the operations further comprise
cropping a portion of a received image of the user interface element that is outside a one-pixel border of the text of the user interface element to obtain the first image.

21. The memory device of claim 19, wherein the operations further comprise
discarding a portion of a received image to obtain the first image, wherein the discarded portion represents a container for other user interface elements.

22. The memory device of claim 19, wherein correlating the subset of the plurality of maxima of the histogram of the second image with the background pixel in the second image further comprises:
   identifying a bin of the histogram that is within a threshold value of the maximum of the background pixel; and
   forming the subset responsive to identifying the bin of the histogram.

23. The memory device of claim 22, wherein the operations further comprise:
   determining a mode of the data set;
   create a next data set that is a subset of the previously created data set, wherein the next data set includes only the values of the previously created data set that are not within a range of the determined mode of the previously created data set plus or minus a threshold, and if the next data set contains at least one value, determining a mode of the next data set;
   if the mode of the next data set is determined, repeating said creating until a data set with no values is created; and
   locating the background pixel in the second image responsive to data set creation completion.

\* \* \* \* \*